(12) United States Patent
Haynes et al.

(10) Patent No.: US 10,640,220 B2
(45) Date of Patent: May 5, 2020

(54) ANTI-KITING DEVICE (71) Applicant: GOODRICH CORPORATION, Charlotte, NC (US)

(72) Inventors: Timothy C. Haynes, Prescott Valley, AZ (US); Jim McEwen, Tempe, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 298 days.

(21) Appl. No.: 15/791,752

(22) Filed: Oct. 24, 2017

(65) Prior Publication Data
US 2019/0118956 A1  Apr. 25, 2019

(51) Int. Cl.
B64D 25/14  (2006.01)

(52) U.S. Cl.
CPC .................... B64D 25/14 (2013.01)

(58) Field of Classification Search
CPC ..................................................... B64D 25/14
See application file for complete search history.

(56) References Cited

U.S. PATENT DOCUMENTS

| 5,820,773 A | 10/1998 | Hintzman et al. | |
|---|---|---|---|
| 6,877,696 B2* | 4/2005 | Moro | B64D 25/14 182/48 |
| 2018/0194482 A1* | 7/2018 | Volny | B64D 25/14 |
| 2018/0327101 A1* | 11/2018 | Haynes | B64D 25/14 |

* cited by examiner

Primary Examiner — Alvin C Chin-Shue
(74) Attorney, Agent, or Firm — Snell & Wilmer, L.L.P.

(57) ABSTRACT

An inflatable evacuation slide is disclosed. The inflatable evacuation slide includes an inflatable tube having a first end and a second end spaced from the first end and an anti-kiting device disposed proximate the second end of the inflatable tube, wherein the anti-kiting device may include a suction surface panel having a first side portion attached to an outer surface of the inflatable tube and a second side portion attached to the outer surface of the inflatable tube.

16 Claims, 6 Drawing Sheets

ANTI-KITING DEVICE

FIELD

The present disclosure relates to inflatable evacuation systems and, more particularly, to anti-kiting devices used to stabilize inflatable evacuation systems during deployment.

BACKGROUND

In the event of an aircraft emergency situation, evacuation systems, such as evacuation slides, are often deployed to safely usher passengers from the aircraft to the ground. Emergency evacuation slides may be used to exit an aircraft absent a jet way or other means of egress for passengers. The evacuation slide may deploy from a door sill or a side of the aircraft fuselage, for example. During deployment in windy conditions, the wind may cause the slide to "kite," meaning that the toe end of the slide does not touch the ground.

SUMMARY

An inflatable evacuation slide is disclosed. In various embodiments, the inflatable evacuation slide includes an inflatable tube having a first end and a second end spaced from the first end and an anti-kiting device disposed proximate an undersurface of the inflatable tube. In various embodiments, the anti-kiting device includes a suction surface panel having a first side portion attached to an outer surface of the inflatable tube and a second side portion attached to the outer surface of the inflatable tube, where the first side portion is spaced apart from the second side portion.

In various embodiments, the inflatable evacuation slide further includes a first side panel connecting the first side portion of the suction surface panel to the outer surface of the inflatable tube. A second side panel may also connect the second side portion of the suction surface panel to the outer surface of the inflatable tube. The inflatable evacuation slide may further comprise an entrance opening and an exit opening. In various embodiments, the entrance opening may be defined by a space between a leading edge of the suction surface panel and the outer surface of the inflatable tube. In various embodiments, the exit opening may be defined by a space between a trailing edge of the suction surface panel and the outer surface of the inflatable tube. In various embodiments, the inflatable evacuation slide may further include a first internal partition that defines first and second flow channels through the anti-kiting device. In various embodiments, the first internal partition connects an intermediate portion of the suction surface panel to the outer surface of the inflatable tube.

In various embodiments, the first side panel and the second side panel are comprised of a flexible material. In various embodiments, the first side panel and the second side panel are configured to provide the suction surface panel with an arcuate shape upon inflation. In various embodiments, an inner surface panel is attached to the outer surface of the inflatable tube and the first side panel and the second side panel connect the suction surface panel to the inner surface panel. In various embodiments, the inner surface panel is attached to the undersurface of the inflatable tube proximate the second end of the inflatable tube.

An evacuation system is also disclosed. In various embodiments, the evacuation system includes an evacuation slide having a first inflatable tube and a second inflatable tube spaced from and connected to the first inflatable tube by a sliding surface. The evacuation system may further include a first anti-kiting device connected to a distal end of the first inflatable tube and a second anti-kiting device connected to a distal end of the second inflatable tube. In various embodiments, the first anti-kiting device includes a first suction surface panel having a first side portion attached to an outer surface of the first inflatable tube and a second side portion attached to the outer surface of the first inflatable tube. Similarly, the second anti-kiting device may include a second suction surface panel having a first side portion attached to an outer surface of the second inflatable tube and a second side portion attached to the outer surface of the second inflatable tube.

In various embodiments, the first anti-kiting device includes a first entrance opening defined by a space between a leading edge of the first suction surface panel and the outer surface of the first inflatable tube and the second anti-kiting device includes a second entrance opening defined by a space between a leading edge of the second suction surface panel and the outer surface of the second first inflatable tube. In various embodiments, the first anti-kiting device includes a first exit opening defined by a space between a trailing edge of the first suction surface panel and the outer surface of the first inflatable tube and the second anti-kiting device includes a second exit opening defined by a space between a trailing edge of the second suction surface panel and the outer surface of the second first inflatable tube.

In various embodiments, the first anti-kiting device further includes a first side panel connecting the first side portion of the first suction surface panel to the outer surface of the first inflatable tube and a second side panel connecting the second side portion of the first suction surface panel to the outer surface of the first inflatable tube. Similarly, the second anti-kiting device may further include a first side panel connecting the first side portion of the second suction surface panel to the outer surface of the second inflatable tube and a second side panel connecting the second side portion of the second suction surface panel to the outer surface of the second inflatable tube. In various embodiments, the first side panel and the second side panel of the first anti-kiting device are configured to provide the first suction surface panel with an arcuate shape upon inflation and the first side panel and the second side panel of the second anti-kiting device are configured to provide the second suction surface panel with an arcuate shape upon inflation.

In various embodiments, an evacuation system for an aircraft includes an evacuation slide comprising a first inflatable tube and a second inflatable tube spaced from and connected to the first inflatable tube by a sliding surface. The first inflatable tube and the second inflatable tube are configured for connection to an aircraft fuselage. A first anti-kiting device is connected to a distal end of the first inflatable tube and a second anti-kiting device is connected to a distal end of the second inflatable tube. In various embodiments, the first anti-kiting device includes a first entrance opening defined by a space between a leading edge of the first suction surface panel and an outer surface of the first inflatable tube. In various embodiments, the second anti-kiting device includes a second entrance opening defined by a space between a leading edge of the second suction surface panel and an outer surface of the second inflatable tube. In various embodiments, the first anti-kiting device includes a first exit opening defined by a space between a trailing edge of the first suction surface panel and the outer surface of the first inflatable tube and the second anti-kiting device includes a second exit opening defined by a space between a trailing edge of the second suction surface panel and the outer surface of the second inflatable tube.

BRIEF DESCRIPTION OF THE DRAWINGS

The accompanying drawings illustrate various embodiments employing the principles described herein and are a part of the specification. The illustrated embodiments are meant for description and do not limit the scope of the claims.

DETAILED DESCRIPTION

All ranges may include the upper and lower values, and all ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Figure 1:
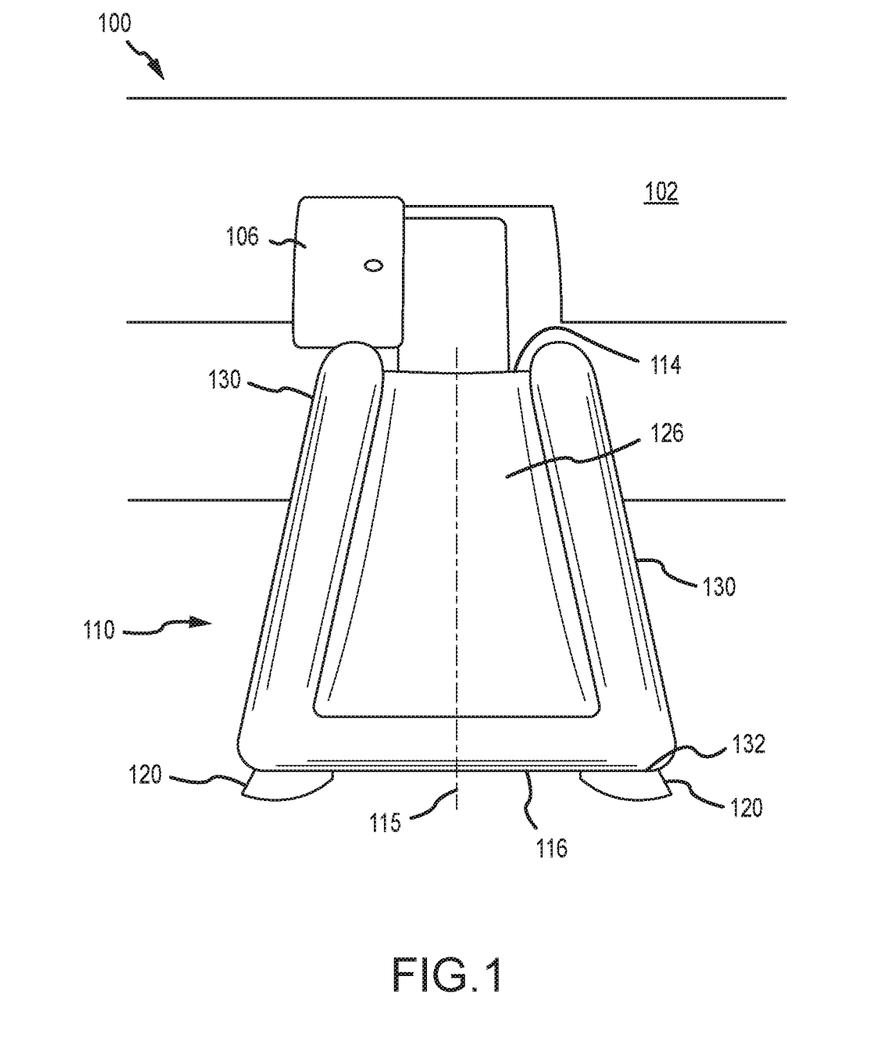
FIG. 1 is a schematic view of an aircraft illustrating an evacuation slide in a deployed state, in accordance with various embodiments.

Referring to FIG. 1, an aircraft 100 having an evacuation slide 110, according to various embodiments, is illustrated. The aircraft 100 may include a fuselage 102 with wings fixed to the fuselage 102. An emergency exit door 106 may be disposed on the fuselage 102 over one of the wings or at some other location along the fuselage 102. The evacuation slide 110 and other components of an evacuation system may be housed within a packboard housing or other compartment mounted to the aircraft 100. The evacuation system may jettison a blowout panel to deploy the evacuation slide 110, such as an inflatable evacuation slide, in response to the emergency exit door 106 opening or in response to another evacuation event. FIG. 1 schematically depicts the evacuation slide 110 in a deployed state, extending from the fuselage 102 of the aircraft 100. During deployment, one or more inflatable tubes 130 are inflated using a source of compressed gas. The evacuation slide may comprise a sliding surface 126 secured to the inflatable tubes 130 and configured for sliding passenger egress from the exit door 106 of the aircraft 100 to the ground or water in the event of a water landing.

Disclosed herein, according to various embodiments, is an anti-kiting device 120 that facilitates controlled deployment of the evacuation slide 110 during windy conditions. Various embodiments of the anti-kiting device 120, as described in greater detail below, are configured for attachment to one or more locations on the evacuation slide 110, such as an underside 132 of an inflatable tube 130. With the anti-kiting device 120 attached as disclosed herein, the evacuation slide 110 can be deployed in a safe and controllable manner to extend from a first end or proximal end 114 (also referred to as a head end) of the evacuation slide 110, mounted to the aircraft 100, to a second end or distal end 116 (also referred to as a toe end) of the evacuation slide 110 that comes in contact with the ground (or water, in the event of a water landing) upon deployment. In various embodiments, the evacuation slide includes a first inflatable tube and a second inflatable tube, each tube comprising an inner surface for containing a charge of compressed gas during inflation and an outer surface. In various embodiments, the evacuation slide 110 includes a longitudinal axis 115 that extends from the first or proximal end 114 to the second or distal end 116. While numerous details are included herein pertaining to utilizing the anti-kiting device 120 in conjunction with the evacuation slide 110 and in the context of an evacuation system for an aircraft 100, the anti-kiting device 120 may be utilized for other purposes and in other applications.

Figure 2:
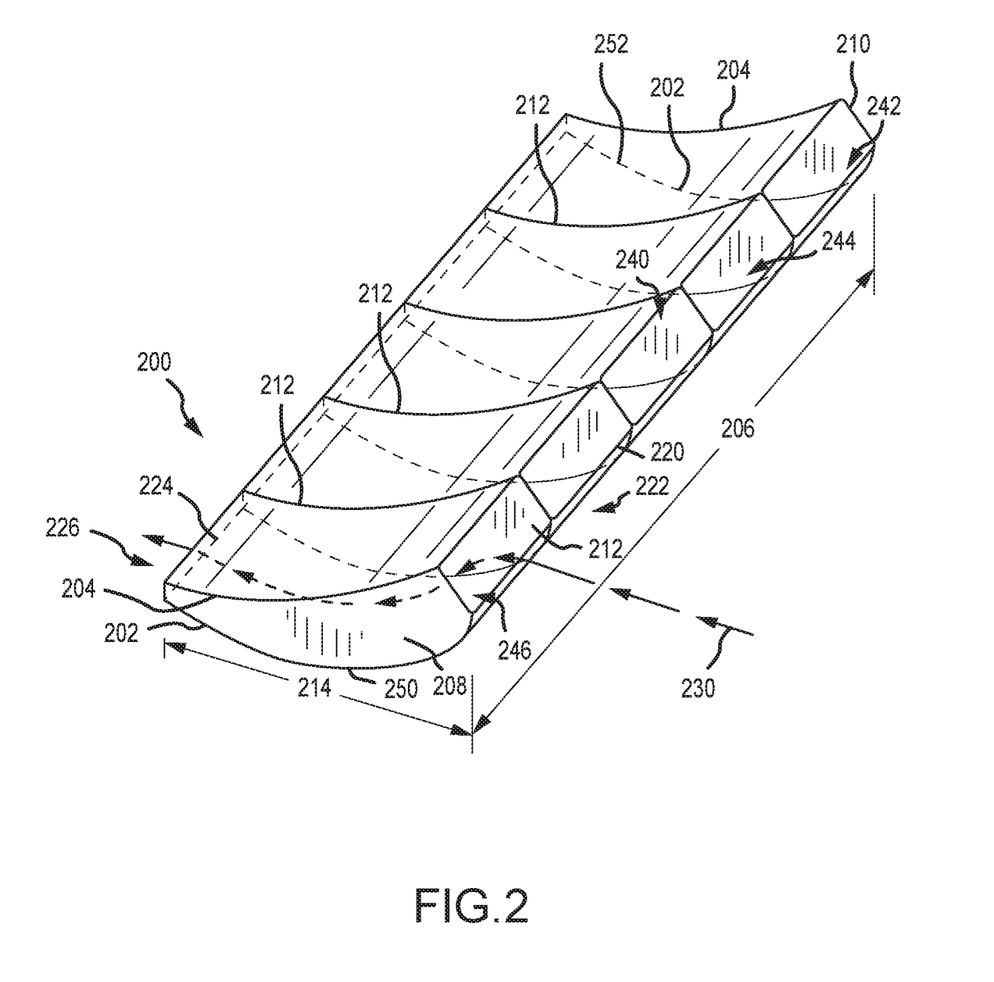
FIG. 2 is a perspective view of an anti-kiting device, in accordance with various embodiments.

Referring to FIG. 2, a perspective view of an anti-kiting device 200 is illustrated, in accordance with various embodiments. In various embodiments, the anti-kiting device 200 includes a lower or suction surface panel 202 and an inner or upper surface panel 204. Both the lower or suction surface panel 202 and the inner or upper surface panel 204 extend along a width 206 of the anti-kiting device 200. A length 214 of the anti-kiting device 200 provides a general measure of the chord length of the device. The anti-kiting device 200 further includes a first side panel 208 and a second side panel 210 positioned at either end of the width 206. In various embodiments, the first side panel 208 connects a first side portion 250 of the suction surface panel 202 to the inner or upper surface panel 204 and the second side panel 210 connects a second side portion 252 of the suction surface panel 202 to the inner or upper surface panel 204. In various embodiments, the first side portion 250 of the suction surface panel 202 is connected directly to the inner or upper surface panel 204 without use of a first side panel 208. Similarly, in various embodiments, the second side portion 252 of the suction surface panel 202 is connected directly to the inner or upper surface panel 204 without use of a second side panel 210. In various embodiments, one or more internal partitions 212 may be positioned intermediate the first side panel 208 and the second side panel 210 and connect an intermediate portion (i.e., a portion intermediate the first side portion 250 and the second side portion 252 along the width 206) of the suction surface panel 202 to an intermediate portion of the inner or upper surface panel 204. In various embodiments, any number of internal partitions may be positioned along the width 206 of the anti-kiting device 200. In various embodiments, no internal partitions 212 are included in the anti-kiting device 200.

In various embodiments, the lower or suction surface panel 202, the inner or upper surface panel 204, the first side panel 208 and the second side panel 210 form a hollow chamber or flow channel 240. In various embodiments, the one or more internal partitions 212 divide the hollow chamber or flow channel 240 into a first flow channel 242, a second flow channel 244 and up to and including an Nth flow channel 246, where N is the number of internal partitions 212 plus one. The anti-kiting device includes an entrance opening 220 proximate a leading edge region 222 of the anti-kiting device 200 and an exit opening 224 proximate a trailing edge region 226 of the anti-kiting device 200. In various embodiments, the suction surface panel 202 and the inner or upper surface panel 204 define an entrance space that is the entrance opening 220. In various embodiments, the suction surface panel 202 and the inner or upper surface panel 204 adjacent the trailing edge region 226 define an exit space that is the exit opening 224. In various embodiments, the entrance opening 220 and the exit opening 224 comprise one or more of the entrance and exit openings from each of the first flow channel 242, the second flow channel 244, up to and including the Nth flow channel 246. In operation, and as more fully described below, the anti-kiting device 200 is configured to allow a freestream wind 230 to flow into the entrance opening 220 and flow out the exit opening 224. In various embodiments, the entrance opening 220 is larger in cross sectional flow area than that of the exit opening 224. The larger flow area at the entrance opening 220 in relation to the flow area at the exit opening 224 allows the anti-kiting device to fill and remain filled when a freestream wind 230 impinges on the entrance opening 220.

In various embodiments, the suction surface panel 202 is configured to provide a smooth, arcuate shape—similar to an airfoil shape—to enable a wind stream to flow smoothly over the panel and generate lift, generally in a downward direction. In various embodiments, the arcuate shape of the suction surface panel 202 may be achieved by connecting the suction surface panel 202 to the upper surface panel 204 using a first side panel 208 and a second side panel 210 that are arcuate is shape. In various embodiments, the arcuate shape of the suction surface panel 202 may be achieved by connecting the suction surface panel 202 to the upper surface panel 204 using internal partitions 212 that are arcuate in shape. In various embodiments, each of the suction surface panel 202, the upper surface panel 204, the first side panel 208, the second side panel 210 and the internal partitions comprise a Nylon fabric, or similarly strong, lightweight and flexible fabric, that is readily foldable for storage and unfoldable upon deployment. In various embodiments, as described below, the inner or upper surface panel 204 may be attached to or be integral with an outer surface of an inflatable tube, such as the outer surface of the first or second inflatable tube 130 described with reference to FIG. 1.

Figure 3:
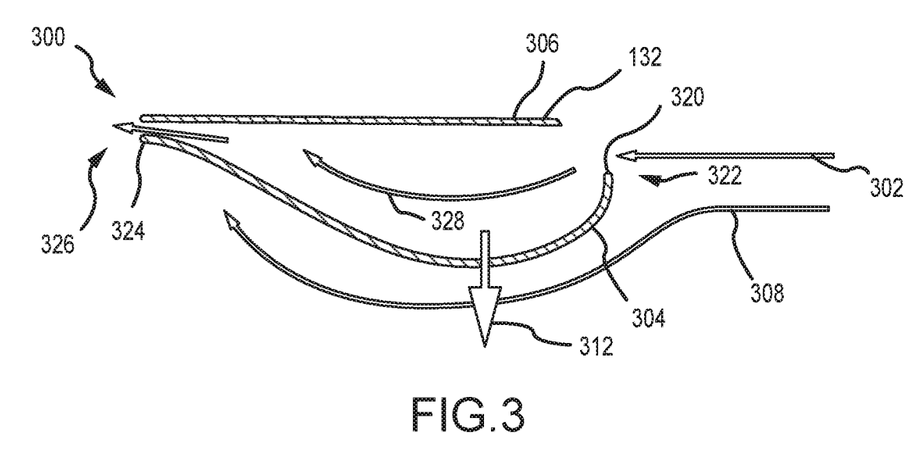
FIG. 3 is a sectional view of an anti-kiting device illustrating various principles of operation of an anti-kiting device, in accordance with various embodiments.

Referring now to FIG. 3, an anti-kiting device 300 in accordance with various embodiments is illustrated. Similar to the guiding physics behind an airfoil, the basics of operation of the anti-kiting device 300 are explained with reference to a cross sectional or two-dimensional form. The anti-kiting device 300 is disposed in a freestream wind 302. The anti-kiting device 300 includes a first or suction surface 304 and a second surface 306. In various embodiments, the second surface 306 may comprise a lower portion of a tubular member of an evacuation slide, such as the underside 132 of the inflatable tube 130 illustrated in FIG. 1. An entrance opening 320 is provided proximate a leading edge region 322 of the anti-kiting device 300. In various embodiments, the entrance opening 320 may be defined by a first space or opening between a leading edge of the first or suction surface 304 and the second surface 306. An exit opening 324 is provided proximate a trailing edge region 326 of the anti-kiting device 300. In various embodiments, the exit opening 324 may be defined by a second space or opening between a trailing edge of the first or suction surface 304 and the second surface 306. As the freestream wind 302 flows past the anti-kiting device 300, a first portion 308 of the freestream wind 302 flows down and over the suction surface 304, resulting in a downward aerodynamic force or downward lift 312 in the downward direction. The second surface 306 of the anti-kiting device 300 here described will generally be a part of an inflatable tube of an evacuation slide. The freestream wind 302 thus either stagnates or flows up and over the inflatable tube of the evacuation slide, thereby contributing a negligible contribution to the downward lift 312. A second portion 328 of the freestream wind 302 flows through the entrance opening 320 and out the exit opening 324. The third portion 328 of the freestream wind 302 serves to fill or inflate the anti-kiting device 300—e.g., in various embodiments, to force flexible materials that comprise the suction surface 304 into the configuration illustrated in FIG. 3. Due to the filled or inflated shape of the anti-kiting device 300, the first portion 308 of the freestream wind 302 generally reaches a higher velocity and, therefore, a lower pressure on the suction surface 304 than elsewhere on the anti-kiting device 300, thus generating a downward aerodynamic force or downward lift 312.

Figure 4:
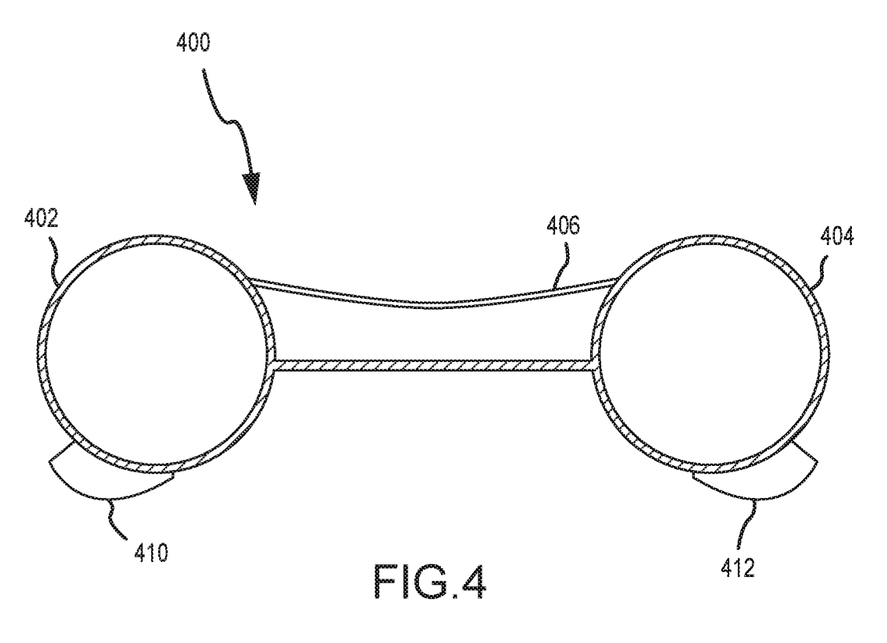
FIG. 4 is a cross sectional view of an evacuation slide with an anti-kiting device, according to various embodiments.

Referring now to FIG. 4, a cross section of an evacuation slide 400 is illustrated. The evacuation slide 400 includes a first inflatable tube 402 and a second inflatable tube 404. The evacuation slide 400 may include a sliding surface 406 secured to the first inflatable tube 402 and the second inflatable tube 404. In various embodiments, the evacuation slide 400 includes other related components, such as sectional supports or beams securing the first inflatable tube 402 and the second inflatable tube 404 in place with respect to each other and supporting the sliding surface. The evacuation slide 400 further includes a first anti-kiting device 410 disposed on an undersurface of the first inflatable tube 402 and a second anti-kiting device 412 disposed on an undersurface of the second inflatable tube 404.

Figure 5A:
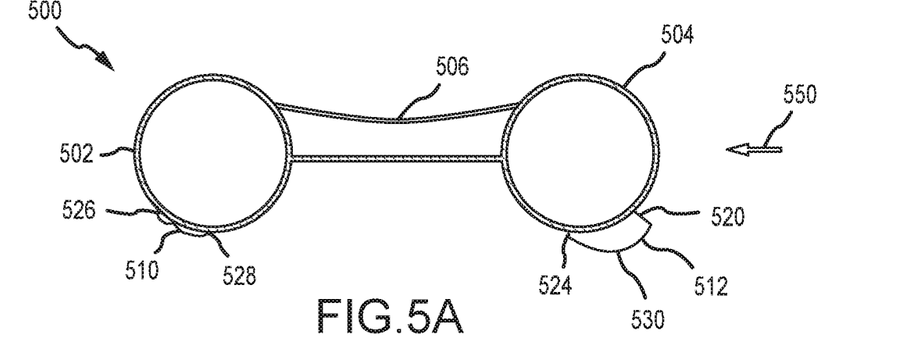
FIGS. 5A, 5B and 5C are cross sectional views of an evacuation slide with an anti-kiting device, according to various embodiments.

Disclosure concerning operation of an evacuation slide in a wind stream, in accordance with various embodiments, is provided in the below description with reference to FIGS. 5A, 5B and 5C. Referring to FIG. 5A, a cross section of an evacuation slide 500 is illustrated. The evacuation slide 500 includes a first inflatable tube 502, a second inflatable tube 504 and a sliding surface 506 secured to the first inflatable tube 502 and the second inflatable tube 504. The evacuation slide 500 further includes a first anti-kiting device 510 disposed on an undersurface of the first inflatable tube 502 a second anti-kiting device 512 disposed on an undersurface of the second inflatable tube 504. A wind stream 550 is illustrated flowing in a lateral direction, such that the first inflatable tube 502 is downstream of the second inflatable tube.

As illustrated in FIG. 5A (and in 5B and 5C), the first anti-kiting device 510 is in a collapsed state. A collapsed state is typically the state both the first anti-kiting device 510 and the second anti-kiting device 512 assume prior to deployment of the evacuation slide 500. Upon deployment, the evacuation slide 500 is exposed to the wind stream 550.

As illustrated, the second anti-kiting device 512 inflates upon exposure to the wind stream 550. More specifically, as the second anti-kiting device 512 is exposed to the wind stream 550, air will flow into an entrance opening 520 and out of an exit opening 524, smaller in cross section than the entrance opening 520. The constricted flow of air through the second anti-kiting device 512 causes the device to fill or inflate, such that a suction surface 530 is forced outward and away from the second inflatable tube 504 and the second anti-kiting device assumes an airfoil-like shape. The first anti-kiting device 510, on the other hand, fails to fill or inflate as the wind is unable to enter the device from an entrance opening 526, larger in cross section than a corresponding exit opening 528 disposed downstream of the entrance opening. In cases where the wind stream 550 flows in a reverse lateral direction, on the other hand, such that the second inflatable tube 504 is downstream of the first inflatable tube 502, then the first anti-kiting device 510 will fill or inflate in the same manner described above, while the second anti-kiting device 512 will remain collapsed.

Figure 5B:
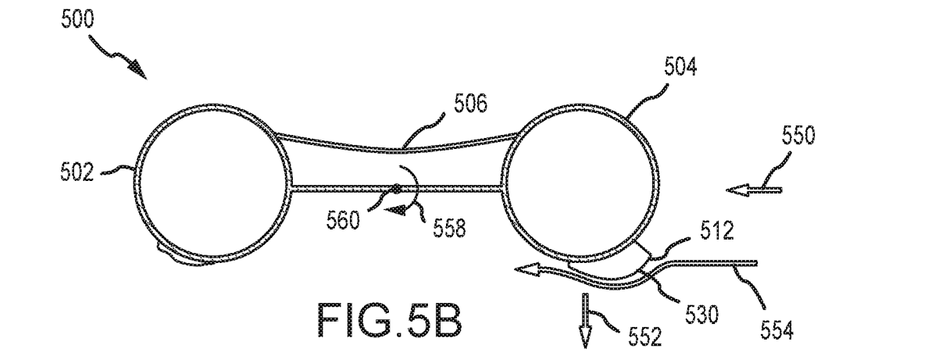

Referring now to FIG. 5B, the wind stream 550 is illustrated flowing over the suction surface 530 of the second anti-kiting device 512 while in the filled or inflated state. A flow of air 554 over the suction surface 530 generates a low pressure region, as described above, over the suction surface 530. The low pressure region results in a downward lift component 552 acting on the second inflatable tube 504, which tends to force the second inflatable tube 504 in a downward direction relative to the first inflatable tube 502. Similarly, the downward lift component 552 creates a moment 558 about a center of rotation 560 of the evacuation slide 500 (or cross section of the slide) that tends to rotate the evacuation slide 500 as indicated in FIG. 5C.

Figure 5C:
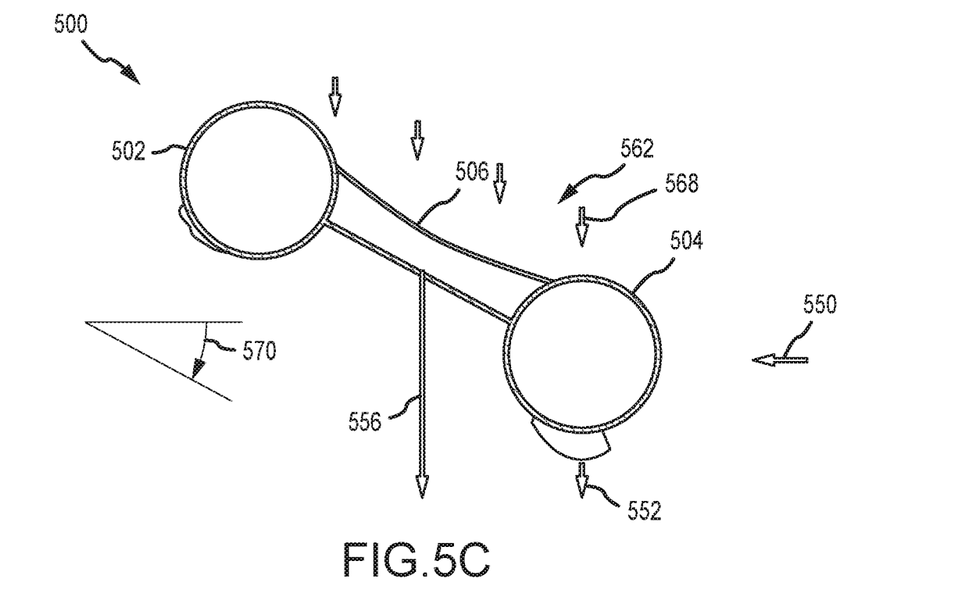

Referring now to FIG. 5C, as the second inflatable tube 504 is forced downward relative to the first inflatable tube 502, or as the evacuation slide 500 rotates about its center of rotation 560, the evacuation slide 500 can exhibit characteristics associated with an airfoil, thereby enhancing the effect of the second anti-kiting device 512. More specifically, as the wind stream 550 imparts upon an upper surface 562 of the evacuation slide 500, such as upon the sliding surface 506, while the slide is at an angle of attack relative to the wind stream 550, the evacuation slide 500 will experience an aerodynamic force, much like a hand experiences an upward or downward force depending upon the angle of attack the hand assumes relative to the wind when placed outside a window of a moving automobile. As a result, a downward force 568 results from the wind stream 550 flowing over and under the evacuation slide 500 when positioned at an angle of attack 570 relative to the wind stream 550. A total downward force 556 acting on the evacuation slide 500 includes contributions from both the downward lift component 552 due to the second anti-kiting device 512 and the downward force 568 due to the wind stream 550 flowing over and under the evacuation slide 500. The total downward force 556 urges the distal end of the evacuation slide 500, such as the distal end 116 illustrated in FIG. 1, toward the ground (or water in the event of a water landing) during and following deployment.

Figure 6:
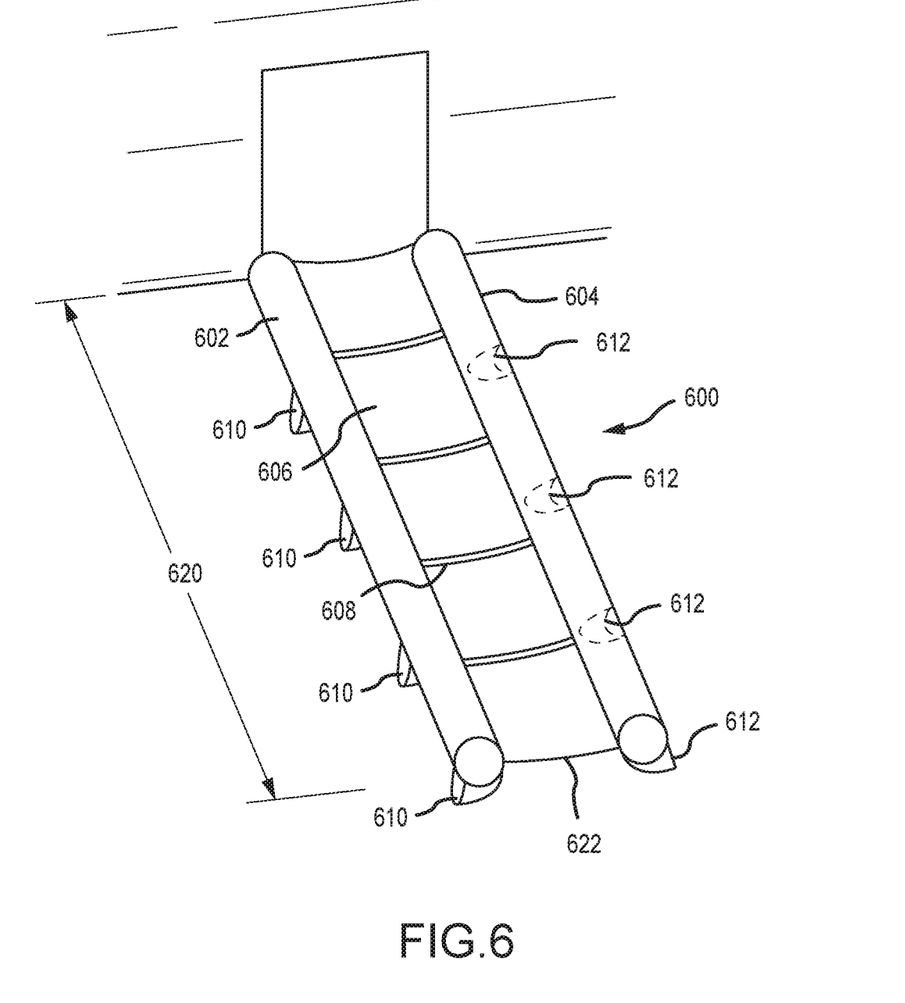
FIG. 6 is a perspective view of an evacuation slide having a plurality of anti-kiting devices attached to first and second tubes, according to various embodiments.

Referring now to FIG. 6, an evacuation slide 600 is illustrated in a deployed state with a head end of the slide attached to an aircraft, such as the aircraft 100 illustrated in FIG. 1. The evacuation slide 600 includes a first inflatable tube 602 and a second inflatable tube 604. The evacuation slide 600 may include a sliding surface 606 secured to the first inflatable tube 602 and the second inflatable tube 604. In various embodiments, the evacuation slide 600 includes other related components, such as sectional supports or beams 608 securing the first inflatable tube 602 and the second inflatable tube 604 in place with respect to each other and supporting the sliding surface 606. In various embodiments, the evacuation slide 600 further includes a first plurality of anti-kiting devices 610 disposed on an undersurface of the first inflatable tube 602 and a second plurality of anti-kiting devices 612 disposed on an undersurface of the second inflatable tube 604. The pluralities of anti-kiting devices may be spaced along a length 620 of the slide, or along a portion of the length 620, typically near a distal end 622 of the slide. Responsive to a lateral wind stream, the upstream plurality of the first plurality of anti-kiting devices 610 or the second plurality of anti-kiting devices 612 will fill or inflate as described above, thereby resulting in a downward lift component acting over a length of the corresponding upstream inflatable tube, rather than a limited portion of the inflatable tube in the vicinity of a single anti-kiting device. In various embodiments, the upstream plurality of the first plurality of anti-kiting devices 610 or the second plurality of anti-kiting devices 612 will fill or inflate as described above, but one at a time as the evacuation unfolds during deployment, with the anti-kiting device most near the aircraft inflating first and the anti-kiting device farthest away from the aircraft (e.g., nearest the distal end of the inflatable tube) inflating last. Pluralities of anti-kiting devices spaced along the length 620 or a portion of the length 620 of the evacuation slide 600 will result in additional controllability and stability to the evacuation slide during and following deployment in a lateral wind condition.

Figure 7:
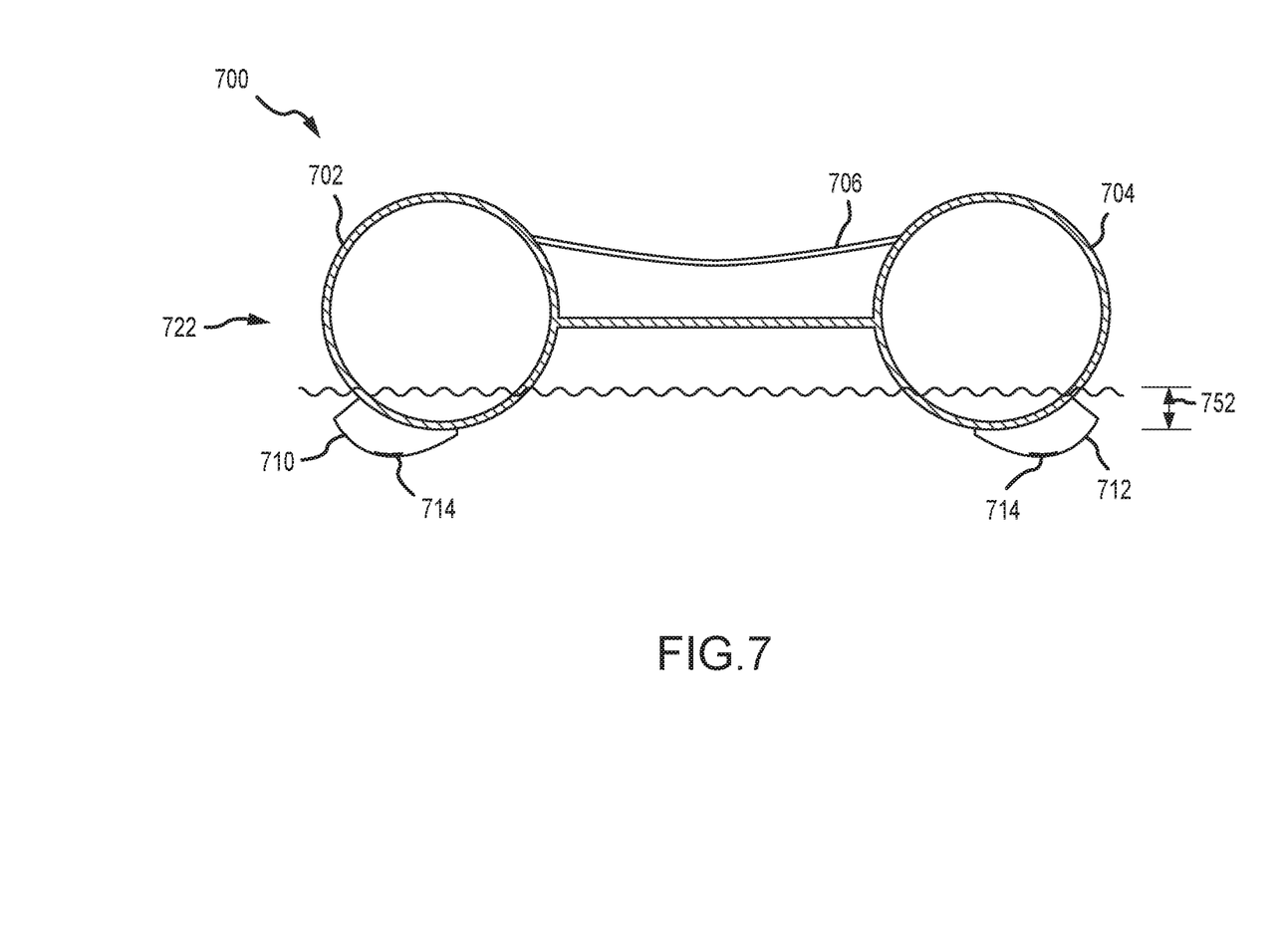
FIG. 7 is a cross sectional view of an evacuation slide with an anti-kiting device, according to various embodiments.

Referring now to FIG. 7, an evacuation slide 700 is illustrated in a deployed state, with at least a toe end 722 of the slide on a surface of water 750 during an emergency evacuation following a water landing. The evacuation slide includes a first inflatable tube 702 and a second inflatable tube 704, a sliding surface 706 secured to the first inflatable tube 702 and the second inflatable tube 704, and a first anti-kiting device 710 disposed on an undersurface of the first inflatable tube 702 and a second anti-kiting device 712 disposed on an undersurface of the second inflatable tube 704. Upon deployment, the weight of the toe end 722 of the slide will typically urge that end of the slide a distance 752 into the water. In various embodiments, the distance 752 is sufficient to submerge one or both of the first anti-kiting device 710 and the second anti-kiting device 712. As the anti-kiting devices are submerged, the devices will fill with water. In various embodiments, weights 714 may be added to lower surfaces of the anti-kiting devices to ensure the devices fill with water upon being submerged. In such case, the anti-kiting devices will produce a resistance to capsizing due to wind or wave motion. The weight of water contained within each anti-kiting device will also counteract a tendency of the inflatable tubes to rise out of the water due to an imbalance in load due to evacuees holding on to the tubes or standing or sitting on the surface 706 or in conditions where waves or a lateral wind are able to impinge upon an underside of the evacuation slide, thereby tending to force the slide in an upward direction with respect to the surface of the water.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed:

1. An inflatable evacuation slide, comprising:
    an inflatable tube having a first end and a second end spaced in a longitudinal direction from the first end; and
    an anti-kiting device disposed proximate the second end of the inflatable tube, wherein the anti-kiting device includes:
        a suction surface panel having a first side portion attached to an outer surface of the inflatable tube and a second side portion attached to the outer surface of the inflatable tube, the first side portion spaced apart from the second side portion in the longitudinal direction, and
        an entrance opening extending in the longitudinal direction and an exit opening spaced from the entrance opening and extending in the longitudinal direction, the entrance opening defined by a first space between a leading edge of the suction surface panel and the outer surface of the inflatable tube and the exit opening defined by a second space between a trailing edge of the suction surface panel and the outer surface of the inflatable tube.

2. The inflatable evacuation slide of claim 1, further comprising a first side panel connecting the first side portion of the suction surface panel to the outer surface of the inflatable tube.

3. The inflatable evacuation slide of claim 2, further comprising a second side panel connecting the second side portion of the suction surface panel to the outer surface of the inflatable tube.

4. The inflatable evacuation slide of claim 3, further comprising an entrance opening and an exit opening.

5. The inflatable evacuation slide of claim 1, further comprising a first internal partition, wherein the first internal partition defines first and second flow channels through the anti-kiting device.

6. The inflatable evacuation slide of claim 5, wherein the first internal partition connects an intermediate portion of the suction surface panel to the outer surface of the inflatable tube.

7. The inflatable evacuation slide of claim 3, wherein the first side panel and the second side panel are comprised of a flexible material.

8. The inflatable evacuation slide of claim 7, wherein the first side panel and the second side panel are configured to provide the suction surface panel with an arcuate shape upon inflation.

9. The inflatable evacuation slide of claim 8, further comprising an inner surface panel attached to the outer surface of the inflatable tube and wherein the first side panel and the second side panel connect the suction surface panel to the inner surface panel.

10. The inflatable evacuation slide of claim 9, wherein the inner surface panel is attached to an undersurface of the inflatable tube proximate the second end of the inflatable tube.

11. The inflatable slide of claim 1, further comprising a second inflatable tube having a first end and a second end spaced from the first end and a second anti-kiting device disposed proximate an undersurface of the second inflatable tube, wherein the second anti-kiting device includes a suction surface panel having a first side portion attached to an outer surface of the second inflatable tube and a second side portion attached to the outer surface of the second inflatable tube, the first side portion spaced apart from the second side portion.

12. An evacuation system, comprising:
    an evacuation slide defining a longitudinal direction when inflated and comprising a first inflatable tube and a second inflatable tube spaced from and connected to the first inflatable tube by a sliding surface;
    a first anti-kiting device connected to a distal end of the first inflatable tube; and a second anti-kiting device connected to a distal end of the second inflatable tube,
- wherein the first anti-kiting device includes a first suction surface panel having a first side portion attached to an outer surface of the first inflatable tube and a second side portion attached to the outer surface of the first inflatable tube, the first side portion spaced apart from the second side portion in the longitudinal direction, and a first entrance opening defined by a first space between a leading edge of the first suction surface panel and the outer surface of the first inflatable tube, the first entrance opening extending in the longitudinal direction, and a first exit opening defined by a first space between a trailing edge of the first suction surface panel and the outer surface of the first inflatable tube; and
- wherein the second anti-kiting device includes a second suction surface panel having a first side portion attached to an outer surface of the second inflatable tube and a second side portion attached to the outer surface of the second inflatable tube, the first side portion spaced apart from the second side portion in the longitudinal direction, and a second entrance opening defined by a second space between a leading edge of the second suction surface panel and the outer surface of the second first inflatable tube, the second entrance opening extending in the longitudinal direction, and a second exit opening defined by a second space between a trailing edge of the second suction surface panel and the outer surface of the second first inflatable tube.

13. The evacuation system of claim 12,
wherein the first anti-kiting device further includes a first side panel connecting the first side portion of the first suction surface panel to the outer surface of the first inflatable tube and a second side panel connecting the second side portion of the first suction surface panel to the outer surface of the first inflatable tube; and
wherein the second anti-kiting device further includes a first side panel connecting the first side portion of the second suction surface panel to the outer surface of the second inflatable tube and a second side panel connecting the second side portion of the second suction surface panel to the outer surface of the second inflatable tube.

14. The evacuation system of claim 13,
wherein the first side panel and the second side panel of the first anti-kiting device are configured to provide the first suction surface panel with an arcuate shape upon inflation; and
wherein the first side panel and the second side panel of the second anti-kiting device are configured to provide the second suction surface panel with an arcuate shape upon inflation.

15. An evacuation system for an aircraft, comprising:
an evacuation slide defining a longitudinal direction when inflated and comprising a first inflatable tube and a second inflatable tube spaced from and connected to the first inflatable tube by a sliding surface, the first inflatable tube and the second inflatable tube configured for connection to an aircraft fuselage;
a first anti-kiting device connected to a distal end of the first inflatable tube; and
a second anti-kiting device connected to a distal end of the second inflatable tube,
- wherein the first anti-kiting device includes a first entrance opening defined by a first space between a leading edge of a first suction surface panel and an outer surface of the first inflatable tube, the first entrance opening extending in the longitudinal direction,
- wherein the second anti-kiting device includes a second entrance opening defined by a second space between a leading edge of a second suction surface panel and an outer surface of the second inflatable tube, the second entrance opening extending in the longitudinal direction,
- wherein the first anti-kiting device includes a first exit opening defined by a first space between a trailing edge of the first suction surface panel and the outer surface of the first inflatable tube, the first exit opening extending in the longitudinal direction; and
- wherein the second anti-kiting device includes a second exit opening defined by a second space between a trailing edge of the second suction surface panel and the outer surface of the second inflatable tube, the second exit opening extending in the longitudinal direction.

16. The evacuation system for an aircraft of claim 15, further comprising
a first internal partition disposed within the first anti-kiting device, wherein the first internal partition defines first and second flow channels through the first anti-kiting device; and
a second internal partition disposed within the second anti-kiting device, wherein the second internal partition defines first and second flow channels through the second anti-kiting device.

* * * * *